United States Patent
Lou et al.

(10) Patent No.: US 10,827,416 B2
(45) Date of Patent: Nov. 3, 2020

(54) MULTI-OPERATOR SPECTRUM RESOURCE SHARING MANAGEMENT

(71) Applicant: AT&T Intellectual Property I, L.P., Atlanta, GA (US)

(72) Inventors: Yuang Lou, Dunwoody, GA (US); Cheng Liu, Johns Creek, GA (US); George Hirvela, Carrollton, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 236 days.

(21) Appl. No.: 16/014,197

(22) Filed: Jun. 21, 2018

(65) Prior Publication Data

US 2019/0394704 A1 Dec. 26, 2019

(51) Int. Cl.
*H04W 48/06* (2009.01)
*H04W 16/14* (2009.01)
(Continued)

(52) U.S. Cl.
CPC ........... *H04W 48/06* (2013.01); *H04L 1/1816* (2013.01); *H04W 8/183* (2013.01); *H04W 12/06* (2013.01);
(Continued)

(58) Field of Classification Search
CPC .................. H04W 16/04–16; H04W 76/15–19
See application file for complete search history.

(56) References Cited

U.S. PATENT DOCUMENTS 7,359,971 B2 4/2008 Jorgensen
7,436,839 B1 10/2008 Kafka et al.
(Continued)

FOREIGN PATENT DOCUMENTS

JP 5645021 B2 12/2014
WO 0223758 A1 3/2002
(Continued)

OTHER PUBLICATIONS

Gomez, Marcela M., et al. "Wireless Network Virtualization: Opportunities for Spectrum Sharing in the 3.5 GHz Band." International conference on cognitive radio oriented wireless networks, Springer, Cham, 2016. http://d-scholarship.pitt.edu/33614/1/eai.12-12-2017.153464.pdf.
(Continued)

*Primary Examiner* — Marcus Smith
(74) *Attorney, Agent, or Firm* — Amin, Turocy & Watson, LLP

(57) ABSTRACT

Example embodiments relate to spectrum resource sharing management. A first mobile network operator (MNO) network device receives a request for network access from a UE operable to communicate with network devices of a first mobile network operator. The first MNO network device determines whether it has enough bandwidth to meet the UE's request, by determining whether a threshold level of utilization of frequencies in a first frequency range allocated to the first MNO network has been met. In response to a determination that the threshold level has been met, the first MNO network device transmits an electronic token to a second MNO network device in a coverage region of the network device, wherein the electronic token is indicative of a request for authorization to use a frequency in a frequency range that is allocated to a second MNO. The second MNO network device can transmit an authorization for the first MNO network device to use the frequency.

20 Claims, 10 Drawing Sheets

(51) Int. Cl.
*H04W 12/06* (2009.01)
*H04W 72/04* (2009.01)
*H04W 8/18* (2009.01)
*H04L 1/18* (2006.01)

(52) U.S. Cl.
CPC ....... *H04W 16/14* (2013.01); *H04W 72/0453* (2013.01)

(56) References Cited

U.S. PATENT DOCUMENTS

| | | |
|---|---|---|
| 7,689,186 B2 | 3/2010 | Matoba et al. |
| 7,764,967 B2 | 7/2010 | Kim et al. |
| 7,801,045 B2 | 9/2010 | Mathews et al. |
| 7,826,850 B2 | 11/2010 | Matoba et al. |
| 7,848,306 B2 | 12/2010 | Ayyagari et al. |
| 8,060,104 B2 | 11/2011 | Chaudhri et al. |
| 8,363,546 B2 | 1/2013 | Freen et al. |
| 9,078,138 B2 | 7/2015 | Andrews et al. |
| 9,215,179 B2 | 12/2015 | Park |
| 9,554,416 B2 | 1/2017 | Mueck et al. |
| 9,584,297 B2 | 2/2017 | Xu et al. |
| 2009/0247204 A1* | 10/2009 | Sennett ............... H04W 16/14 455/512 |
| 2012/0071188 A1* | 3/2012 | Wang ................. H04W 16/14 455/509 |
| 2017/0150506 A1* | 5/2017 | Mitsui ............... H04W 72/0486 |
| 2017/0188241 A1 | 6/2017 | Mueck et al. |
| 2017/0272956 A1* | 9/2017 | Gu ..................... H04W 24/02 |
| 2017/0295497 A1 | 10/2017 | Macmullan et al. |
| 2017/0295578 A1 | 10/2017 | Khoshnevisan et al. |
| 2018/0042018 A1 | 2/2018 | Bhushan et al. |
| 2020/0084797 A1* | 3/2020 | Marjelund ............ H04W 16/14 |

FOREIGN PATENT DOCUMENTS

| | | |
|---|---|---|
| WO | 2016182634 A1 | 11/2016 |
| WO | 2016195751 A1 | 12/2016 |
| WO | 2017139206 A1 | 8/2017 |
| WO | 2017172100 A1 | 10/2017 |
| WO | 2017186294 A1 | 11/2017 |
| WO | 2018004641 A1 | 1/2018 |
| WO | 2018044279 A1 | 3/2018 |

OTHER PUBLICATIONS

Kim, Chang Wook, et al. "Design and Implementation of an End-to-End Architecture for 3.5 GHz Shared Spectrum." Dynamic Spectrum Access Networks (DySPAN), 2015 IEEE International Symposium, 2015. http://www.bell-labs.com/usr/milind.buddhikot/www/psdocs/3.5GHZ_SSPICE/3--5GHz-SAS-Chang-Ryoo-Buddhikot.pdf.

Cai, Mingming, et al., "Database-and Sensing-Based Distributed Spectrum Sharing: Flexible Physical-Layer Prototyping." Signals, Systems and Computers, 2015 49th Asilomar Conference, IEEE, 2015. https://www.researchgate.net/profile/Mingming_Cai2/publication/299441402_Database-and_Sensing-Based_Distributed_Spectrum_Sharing_Flexible_Physical-Layer_Prototyping/links/574afded08ae5c51e29ea261.pdf.

Li, Xuanheng, et al. "Collaborative Spectrum Trading and Sharing for Cognitive Radio Networks." Handbook of Cognitive Radio (2017): 1-38. http://ir.siat.ac.cn:8080/bitstream/172644/10358/1/%E6%95%B0%E5%AD%97-%E5%AE%9E%E6%97%B62016015.pdf.

* cited by examiner

US 10,827,416 B2

MULTI-OPERATOR SPECTRUM RESOURCE SHARING MANAGEMENT

TECHNICAL FIELD

The present application relates generally to the field of wireless communication and, more specifically, to spectrum resource sharing management.

BACKGROUND

Cellular communications technology, including radio access technology, has grown rapidly and evolved since the launch of analog cellular systems in the 1980s, starting from the First Generation (1G) in 1980s, Second Generation (2G) in 1990s, Third Generation (3G) in 2000s, and Fourth Generation (4G) in 2010s (including Long Term Evolution (LTE) and variants of LTE). Fifth generation (5G) access networks, which can also be referred to as New Radio (NR) access networks, are currently being developed and expected to fulfill the demand for exponentially increasing data traffic, and to handle a very wide range of use cases and requirements, including among others, mobile broadband (MBB) services, enhanced mobile broadband (eMBB) services, and machine type communications (e.g., involving Internet of Things (IOT) devices).

Radio resources allocated and distributed as combination grids in frequency domain, time domain, and geographically are limited, but form a valuable foundation to wireless communications. The radio spectrum can comprise the radio frequency (RF) portion of the electromagnetic spectrum (e.g., RF spectrum). The sharing of RF bands of the electromagnetic spectrum for wireless communications is regulated by government entities in most countries, in a spectrum management process known as frequency allocation (also referred to as spectrum allocation), whereby government entities (e.g., the Federal Communications Commission (FCC) and the National Telecommunications and Information Administration (NTIA)) allocate frequency bands (e.g., each band comprising a frequency range) within the RF spectrum to various organizations and entities, including mobile network operators (MNOs) such as AT&T, Verizon, T-Mobile, Sprint, U.S. Cellular, etc. Thus, for example, a first frequency range (e.g., 10-15 MHz) can be allocated to a first mobile network operator (e.g., AT&T), while a second frequency range (e.g., 15-20 MHz) can be allocated to a second mobile network operator (e.g., Verizon), and so on. A network device (e.g., a network node) of AT&T, and AT&T user equipment (UEs), use the frequencies within the first frequency range allocated to AT&T for communications. A network device of Verizon, and Verizon UEs, use the frequencies within the second frequency range allocated to Verizon. This allocation of frequency ranges of the RF spectrum (by the FCC, NTIA) to multiple MNOs can be considered a first level of spectrum sharing. There is a push to identify new technologies and methods that allow the sharing of the spectrum that has already been allocated, that is, sharing spectrum across MNOs. This second level of sharing is expected to enable MNOs to access the capacity required for 5G services and applications, or to alleviate congestion in times of peak demand A network architecture that is simple and efficient (which can lower development and operational costs) that enables the sharing of allocated spectrum to improve spectrum utilization, while based on the current spectrum sharing architecture, can be challenging, as it seeks to address utilization rates to fulfill potential user device access requests and enable fair sharing of allocated spectrum while preventing conflicts (e.g., interference, challenges for the same frequency allocation, etc.). The present application describes example embodiments relating to this second level of sharing.

The above-described background relating to wireless networks is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
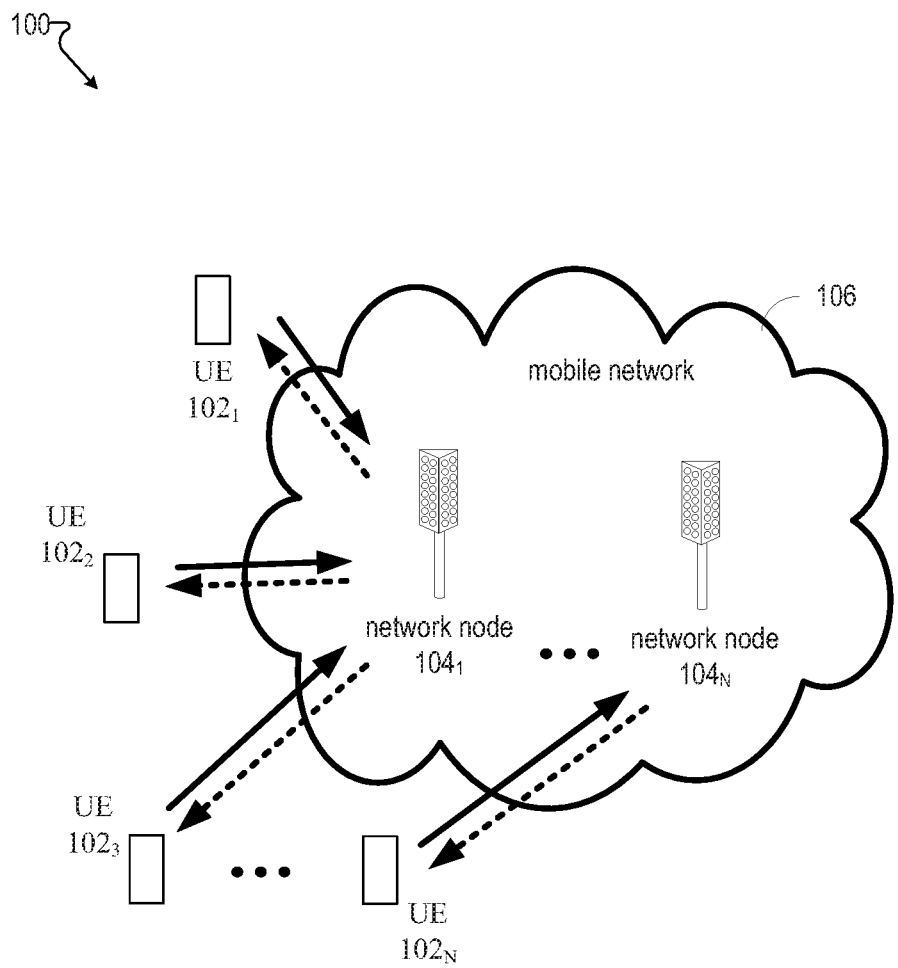
FIG. 1 illustrates an example wireless communication system having a network node (which can also be referred to as a network node device) and user equipment (UE) in accordance with various aspects and example embodiments (also referred to as non-limiting embodiments), of the subject invention.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a more thorough understanding of the subject disclosure. It may be evident, however, that the subject disclosure can be practiced without these specific details. In other instances, structures and devices are shown in block diagram form to facilitate describing the subject disclosure.

The methods and operations (e.g., processes and logic flows) described in this specification can be performed by a device (e.g., one or more devices) comprising programmable processors that execute machine executable instructions (e.g., computer program product, computer-readable instructions, software, software programs, software applications, software modules, etc.) to facilitate performance of the operations described herein. Examples of such a device, or devices, can comprise circuitry and components as described in FIG. 9 and FIG. 10.

The systems, devices, and methods, in accordance with various aspects and example embodiments of the present invention described herein provides for multi-operator spectrum resource sharing management. In example embodiments, a first MNO device (e.g., network node of a first MNO) grants UE requests for access to its network. When the first MNO device of a first MNO has used all of the frequencies (or a threshold number of frequencies) in the frequency range allocated to the first MNO (e.g., allocated by the FCC, NTIA), the first MNO device can send a token to a second MNO device of a second MNO in the same coverage area, requesting authorization to use a frequency (one or more frequencies) in the frequency range that has been allocated to the second MNO. The second MNO device can, after receiving this token, authorize the first MNO device to use one or more of its frequencies. After authorization, the first MNO device can grant requests to its UEs by assigning the frequencies authorized for its use from the second MNO network. Described another way, the second MNO (e.g., Verizon) in a cellular coverage area can temporarily authorize a first MNO (e.g., AT&T) in the same coverage area to use a frequency that was allocated to the second MNO, after receiving a request for more bandwidth from the first MNO. In example embodiments, although the UEs of the first MNO (AT&T's UEs) can tune to all frequencies within the RF spectrum, the UEs communicate only with its own network nodes (e.g., only with AT&T network nodes). The first MNO UEs transmit access requests, and receive grants of the request, only from the first MNO (e.g., AT&T's network nodes). In normal operation, the first MNO's network nodes determine bandwidth, and assigns to the first MNO UEs only the frequencies that are from the first frequency range that was allocated to the first MNO (e.g., a frequency range allocated to AT&T by the FCC, NTIA), even though the first MNO UEs are operable to tune to all frequencies in the RF spectrum. Thus, even though the first MNO UEs' capabilities include the operability of being able to tune to all frequencies in the RF spectrum, in normal operation, by rule, it only tunes to the frequencies assigned to them by a first frequency range allocated to the first MNO. When the first MNO (e.g., AT&T) "borrows" frequencies from a neighboring, second MNO (e.g., Verizon), the first MNO can now assign frequencies that are in the frequency range allocated to the second MNO (e.g., Verizon), and the first MNO UEs tune to the borrowed frequencies assigned to it by the first MNO network devices. This process is thus transparent to the UEs; the first MNO UEs request and tune to frequencies assigned to it by the first MNO network nodes, regardless of whether the frequency was a frequency allocated to the first MNO (AT&T), or a frequency allocated to the second MNO (Verizon) authorized for the first MNO's use. As such, transmissions and communications of a first MNO UE are always between the first MNO UEs and the first MNO's network nodes, and the security for these transmissions and communications are governed by the first MNO's network protocols, not the second MNO's security protocols.

FIG. 1 illustrates an example wireless communication system 100 (also referred to as wireless system, mobile system, mobile communications system) in which embodiments of the present invention can be implemented. In example embodiments (also referred to as non-limiting embodiments), wireless communication system 100 can comprise a mobile network 106 (mobile can also be referred to as cellular), which can comprise one or more mobile networks typically operated by communication service providers. The wireless communication system 100 can also comprise one or more user equipment (UE) $102_{1-N}$ (also referred to by example and in the singular as UE 102). UE $102_{1-N}$ can communicate with one another via one or more network nodes $104_{1-N}$ (referred to as network node 104 by example and in the singular) of the mobile network 106. The dashed arrow lines from the network nodes $104_{1-N}$ to the UE $102_{1-N}$ represent downlink (DL) communications and the solid arrow lines from the UE $102_{1-N}$ to the network nodes $104_{1-N}$ represent uplink (UL) communications.

UE 102 can comprise, for example, any type of device that can communicate with mobile network 106, as well as other networks (see below). The UE 102 can have one or more antenna panels having vertical and horizontal elements. Examples of a UE 102 comprise a target device, device to device (D2D) UE, machine type UE, or UE capable of machine to machine (M2M) communications, personal digital assistant (PDA), tablet, mobile terminal, smart phone, laptop mounted equipment (LME), universal serial bus (USB) dongles enabled for mobile communications, a computer having mobile capabilities, a mobile device such as cellular phone, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a machine-type communication (MTC) device, a C-V2X client device associated with (e.g., integrated with, inside of, embedded in, mounted upon, etc.) a vehicle (e.g., motor vehicle, such as a car, van, bus, truck, etc.), and the like. UE 102 can also comprise IOT devices that communicate wirelessly.

Mobile network 106 can include various types of disparate networks implementing various transmission protocols, including but not limited to cellular networks, femto networks, picocell networks, microcell networks, internet protocol (IP) networks, Wi-Fi networks associated with the mobile network (e.g., a Wi-Fi "hotspot" implemented by a mobile handset), and the like. For example, in at least one implementation, wireless communication system 100 can be or can include a large scale wireless communication network that spans various geographic areas, and comprise various additional devices and components (e.g., additional network devices, additional UEs, network server devices, etc.).

Still referring to FIG. 1, mobile network 106 can employ various cellular systems, technologies, and modulation schemes to facilitate wireless radio communications between devices (e.g., the UE 102 and the network node 104). While example embodiments might be described for 5G New Radio (NR) systems, the embodiments can be applicable to any radio access technology (RAT) or multi-RAT system where the UE operates using multiple carriers. For example, wireless communication system 100 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier FDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), Wi-Fi, Worldwide Interoperability for Microwave Access (WiMax), and the like.

Still referring to FIG. 1, in example embodiments, UE 102 can be communicatively coupled (or in other words, connected) to a network node 104 (e.g., network node 104 device) of the mobile network 106. Network node 104 can have a cabinet and other protected enclosures, an antenna mast, and multiple antennas for performing various transmission operations (e.g., MIMO operations). Each network node 104 can serve several cells, also called sectors, depending on the configuration and type of antenna. Network node 104 can also comprise multi-standard radio (MSR) radio network node devices. Network node 104 can comprise: base station (BS) devices (e.g., a base station controller (BSC), a base transceiver station (BTS)), mobile stations, access point (AP) devices, radio access network (RAN) devices, an MSR BS, a Citizens Broadband Radio Service Device (CBSD), a network controller (e.g., a radio network controller (RNC)), a relay device, a transmission point (TP), a transmission/receive point (TRP), a transmission node, a remote radio unit (RRU), a remote radio head (RRH), nodes in distributed antenna system (DAS), NodeB devices (e.g., an evolved NodeB device, or eNodeB device, as referred to in LTE terminology; gNodeB device, as referred to in 5G terminology), and the like.

In example embodiments described below, several network nodes can operate in the same geographic coverage area and may be owned and operated by different mobile network operators (MNOs).

Still referring to FIG. 1, in various embodiments, mobile network 106 can be configured to provide and employ 5G cellular networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

Still referring to FIG. 1, to meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 Gbps to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

The upcoming 5G access network can also employ an architecture in which a user plane and control plane are separate, wherein complex control plane functions are abstracted from forwarding elements, simplifying user plane operations by relocating control logic to physical or virtual servers. Each plane carries a different type of traffic and can be implemented as overlay networks that runs independently on top of another one, although supported by its infrastructure. The user plane (sometimes known as the data plane, forwarding plane, carrier plane, or bearer plane) carries the user data traffic, and the control plane carries signaling traffic. In example embodiments, the planes can be implemented in the firmware of routers and switches.

Figure 2:
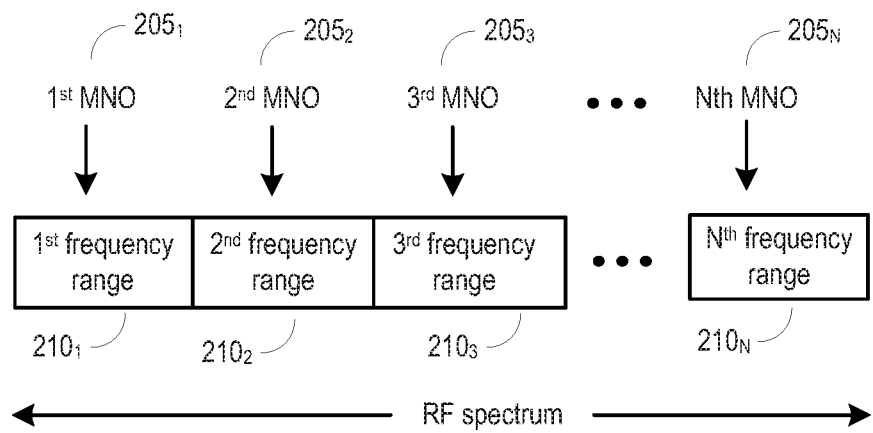
FIG. 2 illustrates an example in which mobile network operators (MNOs) operating in a region are each allocated a frequency band within the radio frequency (RF) spectrum, in accordance with various aspects and example embodiments of the present invention.

FIG. 2 provides an illustration of an example in which MNOs (also referred to as MNO entities) operating in a region, wherein the coverage area of each MNO's mobile network overlap, are each allocated a frequency band within the RF spectrum. Here, each MNO is assigned a frequency band for upstream and downstream communications for UEs registered on that MNO's network. In the United States, the Federal Communications Commission (FCC) and the National Telecommunications and Information Administration (NTIA) share regulatory responsibility for allocating portions of the RF spectrum. Conventionally, the FCC and NTIA allocates portions of the spectrum (e.g., frequency bands within the spectrum) partly through an auction process. As illustrated in FIG. 2, a first MNO $205_1$ can be allocated a first frequency range $210_1$ of the RF spectrum, a second MNO $205_2$ can be allocated a first frequency range $210_2$, a third MNO $205_3$ can be allocated a third frequency range $210_3$, until an Nth MNO $205_N$ can be allocated an nth frequency range $210_N$, whereby "N" represents some number. After allocation, each MNO can communicate with UEs registered on its network via the frequencies in the frequency range allocated to that MNO. For example, a network node (e.g., network node 10). This allocation allows each MNO to communicate with UEs in a particular geographic region on its own frequencies, without overlap (e.g., interference) with the other MNOs communicating with their respective UEs on other frequencies.

Even though this conventional granting process for spectrum allocation is simple and mature, it is becoming insufficient for addressing the rapid expansion of the wireless communications industry, especially in light of the proliferation of wireless devices and services. MNOs are demanding more spectrum permissions that exceed the spectrum available at public auctions. This conventional approach is meeting its limits. Once spectrum has been allocated (e.g., auctioned), an MNO might need additional spectrum in a particular area, but it typically cannot use the radio resources allocated to another entity, even when these radio resources are idle at some moments in certain service areas.

Figure 3:
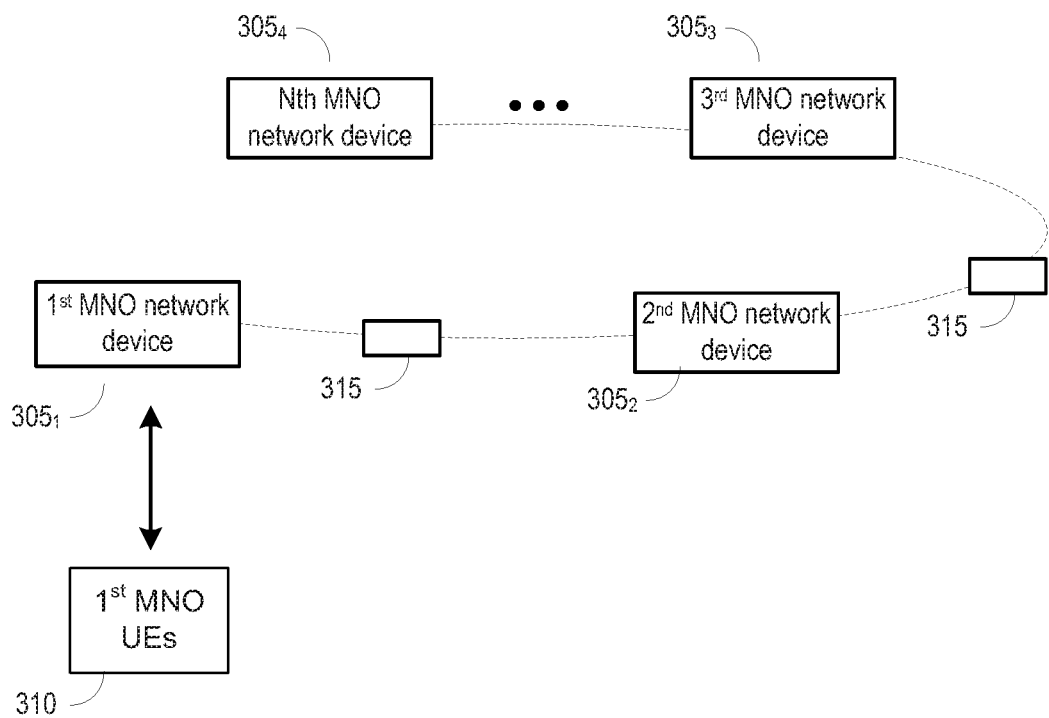
FIG. 3 illustrates a system and method for multi-operator spectrum resource sharing management, in accordance with various aspects and example embodiments of the present invention.

FIG. 3 illustrates a system and method for multi-operator spectrum resource sharing management, in accordance with example embodiments of the present invention. A first MNO is assigned a frequency band (e.g., first frequency range $210_1$) to serve its own UEs (as described above with respect to FIG. 2). Once frequencies are fully, or close to fully, assigned to UEs requesting access to the first MNO network, the MNO network can generate an electronic token and transmit it to a neighboring MNO network operating in the same coverage area. Upon receiving the token, the neighboring MNO network can authorize (e.g., grant) an available frequency, or frequencies, for use by the requesting MNO. If the neighboring MNO network does not have the resources to authorize frequencies to the requesting MNO network, it passes the electronic token to another MNO network in the same coverage area.

FIG. 3 shows blocks representative of MNOs (e.g., MNO network devices) operating in the same geographic region, wherein the mobile network coverage area of the MNO network devices overlap. For example, the system can comprise a first MNO network device $305_1$ owned or operated by a first MNO (e.g., first MNO $205_1$), a second MNO network device $305_2$ owned or operated by a second MNO (e.g., second MNO $205_2$), a third MNO network device $305_3$ owned or operated by a third MNO (e.g., third MNO $205_3$), up to an Nth MNO network device 305N owned or operated by an Nth MNO (e.g., Nth MNO $205_N$), where "N" represents some number. An MNO network device can comprise one or more devices within an MNO's network.

An MNO network device can be, for example, a network node (e.g., network node 104, or one or more network nodes $104_{1-N}$) capable of communicating with one or more UEs registered on the MNO's network. The network node can allocate frequencies from within its allocated frequency range to its own UEs. As an example, first MNO network device $305_1$ can communicate with first MNO UEs 310, wherein first MNO UEs 310 can comprise one or more UEs (e.g., UEs $102_{1-N}$). It can communicate with the first MNO UEs 310 on one or more frequencies within the first frequency range $210_1$, which, as explained with respect to FIG. 2 above, is the frequency range of the RF spectrum allocated to the first MNO $205_1$ (e.g., through an auction process). In example embodiments, an MNO network device can also comprise devices coupled, or connected to, the network node. It can be, for example, devices that are part of cellular data core of the MNO, for example a radio access network (RAN) controller device (e.g., mobility management entity (MME) device in LTE terminology, access and mobility management function (AMF) mobile entity device in 5G terminology, etc.), a gateway device, or some other networked computing device that resides in the MNO's network.

Still referring to FIG. 3, in example embodiments of the present invention, a network node of the first MNO network (e.g., a network node 104, such as network node $104_1$, associated with first MNO $205_1$) can receive requests for access from UEs (e.g., a first MNO UEs 310) that are registered to communicate with network nodes of the first MNO $205_1$. The network node, in response to the requests, can allocate frequencies on which the UEs can transmit and receive information to and from the network node. The frequencies are frequencies that lie within the range of frequencies allocated to the first MNO entity by, for example, a government entity (e.g., first frequency range $210_1$). A condition might arise, however, in which all, or substantially all, of the frequencies are allocated to meet the requests of the first MNO's UEs. If more requests from UEs were to arrive, the network node might not be able to accommodate those requests, as all, or a threshold number of, frequencies (and in example embodiments, frequencies and time slots on a frequency) have already been assigned. If the network node determines that the RF resources of its allocated frequency range have reached a threshold (e.g., fully assigned, 95% assigned, etc.), an MNO network device (e.g., first MNO network device $305_1$, which in some example embodiments, can be the network node itself) can, in response to the determination, generate and transmit an electronic token (e.g., electronic token 315) to another MNO network device owned or operated by another MNO operating in the same coverage area. Referring to FIG. 3, by way of illustration, the second MNO network device receiving the electronic token can be second MNO network device $305_2$. Second MNO network device $305_2$ can be, for example, a network node (e.g., network node $104_2$) owned and operated by a second MNO $205_2$).

The second MNO network device that receives the token can be, for example, the nearest neighboring MNO network device to the first MNO network device that transmitted the token. The second MNO network device that receives the token can be, for example, an MNO appearing first on a list comprising all MNOs in the coverage area that share allocated spectrum.

The electronic token (e.g., electronic token 315) can comprise data elements, for example, frames of data that contain information that can be taken as a request for an authorization, or a network access request, to use one or more frequencies in a second frequency range (e.g., second frequency range $210_2$) that was allocated to the second MNO network (e.g., second MNO $205_2$). The electronic token can comprise, for example, information that identifies the requesting MNO (e.g., or requesting MNO network device). The electronic token can also comprise information that specifies how much bandwidth is required by the MNO network device transmitting the token. In some example embodiments, the request can be for a bandwidth amount (e.g., 3 MHz frequency band needed). In other example embodiments, the electronic token can request a target number of frequencies (e.g., request 3 frequencies). This specified requested allocation amount can be determined based on the level of utilization (or level of congestion) experienced by the network node of the first MNO that is seeking more frequencies.

Upon receiving the electronic token, the receiving MNO network device (e.g., second MNO network device $305_2$) can transmit an authorization message to the first MNO network device (e.g., first MNO network device $305_1$) if the receiving MNO network device has determined that it can spare frequencies from its allocated frequency range (e.g., second frequency range $210_2$) to the requesting MNO. The authorization message can identify which frequency(s) has been authorized for use, as well as indicate which MNO has authorized the frequency use. After the MNO has granted authorization to the first MNO to use a frequency, the second MNO discontinues use of the frequency it has "loaned" out, until it hears back from the first MNO (see below).

In other example embodiments, which a UE can be modified to be operable to support, if the second MNO network device has determined that it cannot spare the bandwidth (e.g., any frequency or frequencies to loan the first MNO, or can only authorize a portion of the amount requested, the second MNO network device can route (e.g., forward, re-transmit, etc.) the electronic token to another, third MNO network device (e.g., third MNO network device $305_3$) in the same coverage region as the first MNO network device. In the case that it can meet a portion of the amount requested, it can send an authorization message for the portion it can meet (e.g., identify the frequency(s) it can spare), and then adjust the allocation requested in the electronic token before routing it to the next MNO network device. As an example, if the original token requested 3 frequencies, and the receiving MNO network device determined that it can spare 2 out of 3 of the frequencies, then it will send an authorization message authorizing and identifying 2 frequencies, and pass on the electronic token after modifying the requested number of frequencies in the electronic token from 3 to 1, before passing the token on to the next MNO network device. The next MNO network device can then determine whether to authorize any of its spare frequencies for the requesting MNO to use. If it has no spare frequencies, it can pass on the electronic token to another MNO in the coverage area (e.g., until it reaches the Nth MNO network device). In these example embodiments, in the simple case, a UE can physically operate on all spectrums across all MNOs, as a continuous RF assignment, and can operate on frequencies assigned to it by its own MNO network device. Additionally, a UE can be programmed to be operable to perform carrier-aggregation across two spectrums that have been separated. For example, if a second MNO grants a portion of the spectrum, and a third MNO grants a second, non-contiguous, portion of the spectrum, and the frequency bands from these two portions are non-contiguous, the first MNO network device can still assign these frequencies to a UE that has been programmed to be operable to perform carrier-aggregation and utilized two, non-contiguous frequency bands.

In other example embodiments, a first MNO might receive non-contiguous portions of bandwidth from other MNOs, but utilize the authorized portions by rejecting some UE requests until it can free up contiguous frequencies from its own allocated frequency range (e.g., first frequency range $210_1$), and assign these contiguous frequencies to satisfy certain UE network access requests, while assigning frequencies authorized from other MNOs to satisfy other UE network access requests.

In example embodiments, the electronic token can contain a routing list of MNO devices to which the electronic token can be forwarded. If the MNO device receiving the electronic token is unable to fully fulfill the request, it can forward the electronic token to the next MNO operator on the list.

In some example embodiments, the electronic token request can be a token that does not specify an allocation amount (e.g., does not need to specify the number of frequencies needed). The receiving MNO network device can, based on the receipt of the token, transmit an authorization message identifying only one of the frequencies from the receiving MNO's allocated frequency range (and the frequency can be identified) to be used by the requesting MNO. If the requesting MNO requires more bandwidth than can be met by the authorization of only one frequency, the requesting MNO can transmit another electronic token. Thus, extra bandwidth, in these example embodiments, can be requested for and authorized one frequency at a time, until the requesting MNO network device no longer requires additional frequencies to meet its UEs requests.

In yet other example embodiments, if the requesting MNO network device receives an authorization message containing any amount less than the requested amount of bandwidth, the requesting MNO network device can transmit another electronic token requesting an amount of bandwidth equal to the remainder. For example, if the requesting MNO network device received an authorization for 2 frequencies but had requested 3 frequencies, it can send out a subsequent electronic token requesting 1 frequency.

If no MNO network devices can comply with the request for additional frequencies, then this would mean that all frequencies in the coverage area are being used, and the frequency usage in the area is saturated, and all frequency resources are being fully utilized. If a certain amount of time has elapsed in which the electronic token has been ignored, the requesting MNO can transmit another electronic token and the requesting process can repeat itself.

Once the requesting MNO network device (e.g., first MNO network device $305_1$) receives the authorization message identifying one or more frequencies it is now authorized to use, and identifying the authorizing MNO, that frequency(s) can then be used for transmissions to and from UEs registered with the requesting MNO (e.g., first MNO UEs 310). In example embodiments, each UE can be operable to communicate on any frequency in the entire RF spectrum, but only sends requests to the network node associated with the MNO it is registered to communicate with (e.g. it only knows its own MNO's network nodes). The MNO network node either assigns frequencies from its own frequency range, or assigns a frequency authorized for use by a neighboring MNO in the same coverage area. The UEs receive granted channel access (e.g., the frequency assignment) without asking where the grant of channel access is coming from. The UEs typically only communicates on frequencies in a frequency range granted to the MNO its registered with, but if the MNO was able to successfully obtain access to a frequency from another MNO, the UEs would communicate on that frequency as well, if it becomes assigned to one or more of those UEs.

Once the traffic dips below a threshold, the requesting MNO device (e.g., first MNO network device $305_1$) can transmit a release message to the authorizing MNO network device (e.g., second MNO network device $305_2$). Upon receiving the release message, the authorizing MNO network device can begin using the previously loaned out frequency for its own UEs once again.

In example embodiments, a situation may arise in which the authorizing MNO network device (e.g., second MNO network device $305_2$) suddenly begins to experience high volumes of requests from its UEs. In response to this, the authorizing MNO network device can, in some embodiments, send an electronic token requesting frequency authorization from another MNO in the same coverage area (e.g., from third MNO network device $305_3$). In some other example embodiments, the authorizing MNO network device, if it too begins to experience a high volume of requests, can send a termination notice, which can be a message informing the first MNO network device that its earlier authorization to use its frequencies has now terminated. Upon receiving this termination notice, the requesting MNO network can discontinue using the previously authorized frequencies. If the requesting MNO network still needs additional frequencies, it can then send out another electronic token requesting authorization from another MNO network device in the same coverage area.

Figure 4:
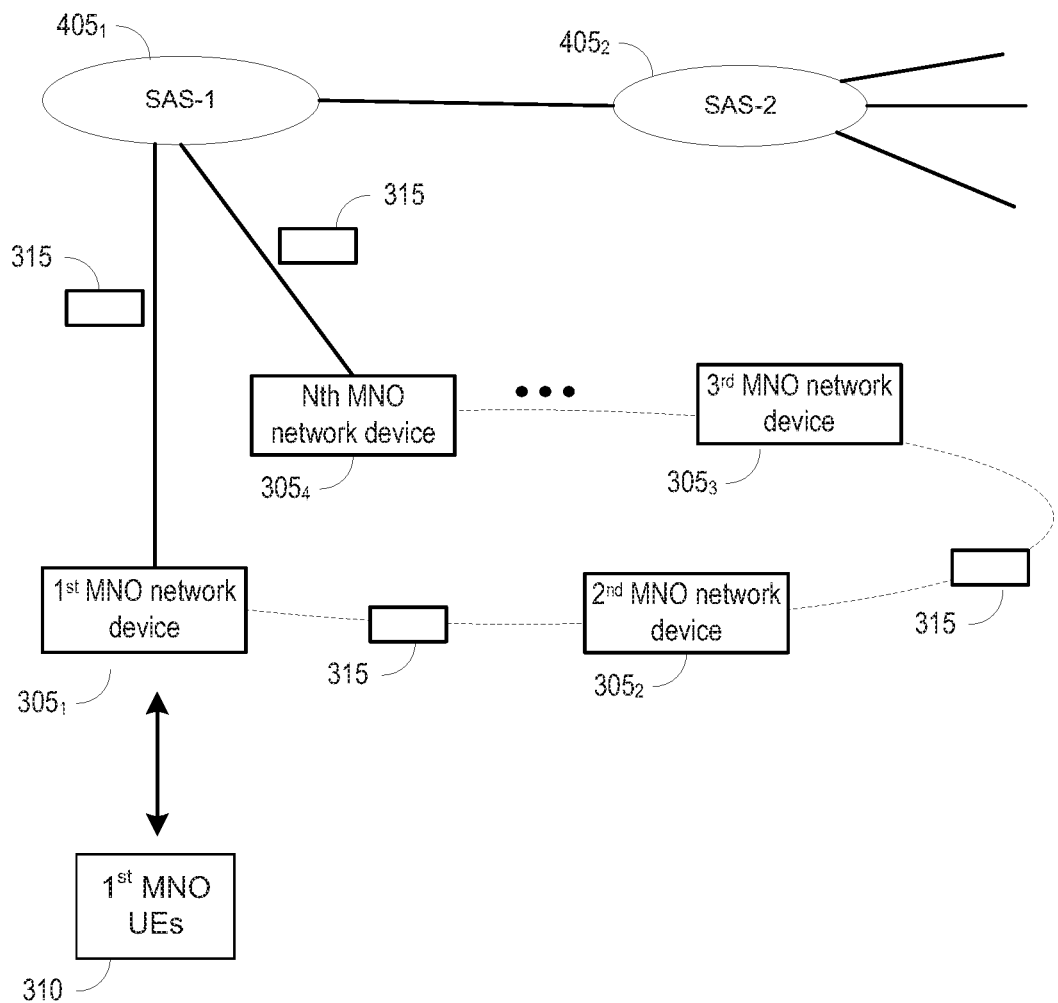
FIG. 4 is another illustration of a system and method for multi-operator spectrum resource sharing management, in accordance with various aspects and example embodiments of the present invention.

FIG. 4 illustrates another system and method for spectrum resource sharing in accordance with example embodiments of the present invention. In this illustration, an MNO (e.g., first MNO network device $305_1$) that requires additional frequencies beyond the range of frequencies it has been allocated can either directly transmit the electronic token (e.g., electronic token 315) to other operators (e.g., second MNO network device $305_2$, etc.), or pass the electronic token to a spectrum access system (SAS) (e.g., SAS-1 $405_1$), which can be connected to one or more other SASs (SAS-2 $405_2$) that have overlapping coverage.

SAS spectrum management, as known by those of ordinary skill, involves a spectrum management system in which incumbents (e.g., department of defense (DoD), fixed satellite systems (FSS), Radio Location Services (RLS), and Terrestrial Wireless systems) are the current users of a spectrum, which get spectrum interference protection from lower tied entities. An SAS is used to coordinate spectrum access in this system. The lower tiered entities are priority access (PA) entities, which vacate the spectrum from incumbents, but enjoy priority over generalized authorized access (GAA) tiered entities.

In example embodiments, still referring to FIG. 4, if token-pass sharing cannot be accomplished within the MNOs under, for example, SAS-1 $405_1$, the electronic token can be passed to other operators under SAS-2 $405_2$. As such, the SASs can be used to pass tokens from one set of MNOs operating under one SAS to another set of MNOs operating under another SAS. In example embodiments of the present invention, if an MNO (e.g., first MNO network device $305_1$) requesting additional frequencies from neighboring MNOs in the same coverage area does not receive an authorization message within a specified period (e.g., a certain amount of time has elapsed) from its neighboring MNOs in the overlapping coverage area, it can then send the electronic token to its associated SAS (e.g., SAS-1 $405_1$), which can then pass the token to another SAS (e.g., SAS-2 $405_2$) in the same coverage region.

In other example embodiments, still referring to FIG. 4, the last MNO in the routing list (e.g., Nth MNO network device $305_4$), if it has no frequencies to spare, can forward the token to the SAS-1 $405_1$.

Figure 5:
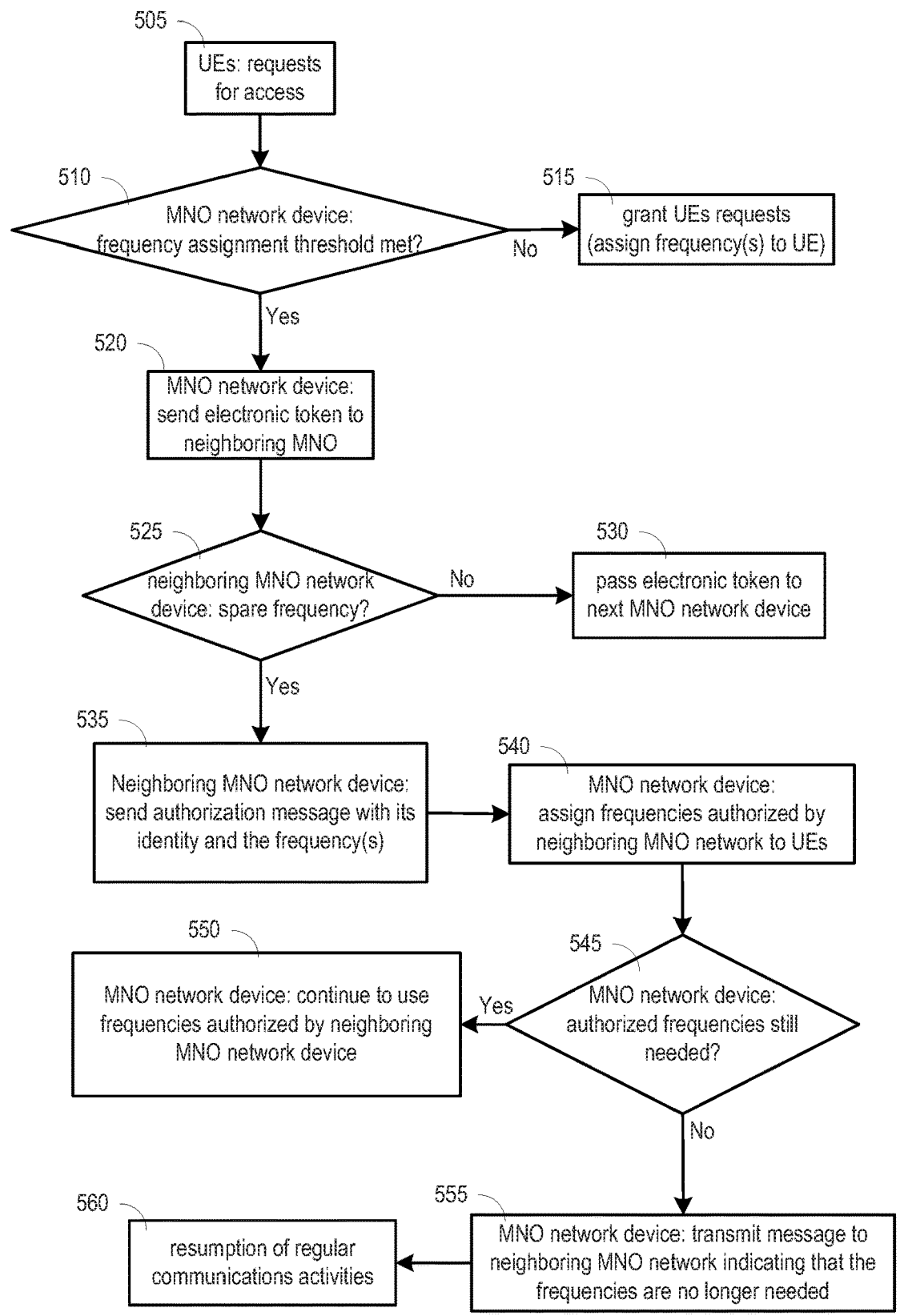
FIG. 5 illustrates an example method performed by MNO network devices, in accordance with various aspects and example embodiments of the present invention.

Moving on, FIG. 5 illustrates example operations that can be performed by several of devices in accordance with example embodiments of the present invention. The operations can begin at block 505, whereby a UE (or UEs) can send a request for network access to a first MNO network device (e.g., first MNO UEs 310 request access from first MNO network device $305_1$, which can be a network node, e.g., network node $104_1$). Here, the UEs (first MNO UEs 310) are only capable of communicating with the first MNO network device $305_1$, and can only receive a grant of its requests from the first MNO network device 305. For example, AT&T UEs can only request access from AT&T network nodes, and can only receive a grant of access from AT&T network nodes.

At block 510, the first MNO network device determines bandwidth, and whether bandwidth is sufficient, to satisfy the UE's request for access (the UEs send the requests for network access, but do not determine any bandwidth amount). A determination is made by the first MNO network device as to whether it has enough bandwidth (e.g., frequencies from among the frequencies in the frequency range (e.g., first frequency range $210_1$) allocated to it by a government entity (see FIG. 2 above and corresponding text)) to grant the UE's network access request. In example embodiments, a determination is made by the MNO network device whether a frequency assignment threshold has been met. That is, whether its frequency resources within its allocated frequency range (e.g., first frequency range $210_1$, which, as mentioned in FIG. 2, was the frequency range allocated by, e.g., a government entity, to the first MNO) have reached a threshold of utilization (e.g., frequencies have been fully assigned, or close to fully assigned). The threshold can be, for example, a number of frequencies assigned, or it can be a fraction or percentage (e.g., 95%) of frequencies that have been assigned, etc.

In response to a determination that the frequency assignment threshold has not been met (or exceeded), at block 515, the MNO network device can continue to assign frequencies to requesting UEs in response to the UEs' requests for network access.

In response to a determination that the frequency assignment threshold has been met (or exceeded), at block 520 the MNO network device can generate and transmit (e.g., send) an electronic token, as described above with respect to FIG. 3 (e.g., electronic token 315), to a neighboring MNO network device owned or operated by another MNO operating in the same coverage area (e.g., second MNO network device $305_2$). The neighboring MNO network device that receives the token can be, for example, the nearest neighboring MNO network device to the first MNO network device that transmitted the token. In other example embodiments, the neighboring MNO network device, that receives the token can be a first listed MNO on a list comprising all MNOs in the coverage area that share allocated spectrum.

Upon receiving the electronic token, the neighboring MNO network device (e.g., second MNO network device $305_2$) can at block 525 determine whether it has frequencies from its own allocated frequency range (e.g., second frequency range $210_2$, which had been allocated to the second, neighboring MNO by, e.g., government entities to spare.

In example embodiments, if the neighboring MNO network device has determined that it cannot spare any frequencies, or can only authorize a portion of the amount requested, then at block 530 it can pass (e.g., route, forward, re-transmit, etc.) the electronic token to another MNO network device (e.g., third MNO network device $305_3$) operating in the same coverage area as that of the requesting MNO network device. If the receiving MNO network device has determined that it cannot spare the bandwidth to the requesting MNO, the receiving MNO network device can pass the electronic token to another MNO network device (e.g., third MNO network device $305_3$). This next MNO network device can then also determine whether to authorize spare frequencies for the requesting MNO to use. If it has no spare frequencies, it can pass on the electronic token to another MNO in the coverage area (e.g., until it reaches the Nth MNO network device).

In example embodiments, if the neighboring MNO network device has determined that it cannot spare the bandwidth to the requesting MNO, or can only authorize a portion of the amount requested, the receiving MNO network device can route (e.g., forward, re-transmit, etc.) the electronic token to another MNO network device (e.g., third MNO network device $305_3$). The electronic token's requested bandwidth amount can be adjusted to reflect the outstanding amount of bandwidth needed (e.g., remaining number of frequencies needed) prior to routing the token to the next MNO network device. This next MNO network device can then also determine whether to authorize spare frequencies for the requesting MNO to use. If it has no spare frequencies, it can pass on the electronic token to another MNO in the coverage area (e.g., until it reaches the Nth MNO network device). In example embodiments, the electronic token can contain a routing list of MNO devices to which the electronic token can be forwarded. If the MNO device receiving the electronic token is unable to fulfill the request, it can forward the electronic token to the next MNO operator on the list.

If the neighboring MNO network device has determined that it can spare frequencies (even a portion of the requested amount), then at block 535 it can transmit an authorization message to the MNO network device (e.g., first MNO network device $305_1$) that generated and transmitted the electronic token. The authorization message can identify which frequency(s) has been authorized for use, as well as indicate which MNO has authorized the frequency use. After the neighboring MNO has granted authorization to the requesting MNO to use a frequency, the neighboring MNO will discontinue using the frequency it has "loaned out," until it receives a message from the requesting MNO network device used to indicate that the frequency is no longer required.

Once the MNO network device (e.g., first MNO network device $305_1$) receives the authorization message identifying one or more frequencies, it can at block 540 utilize the identified frequencies and assign the frequencies for use by requesting UEs.

In example embodiments, at block 545, the requesting MNO network device can determine whether the frequency(s) authorized by the neighboring MNO network are still needed (e.g., determine whether frequency assignment threshold has dipped below At 550, if the requesting MNO network device has determined that the authorized frequency(s) is still needed, the requesting MNO network can continue to use the frequency.

If the requesting MNO network device has determined that the authorized frequency(s) is no longer needed, it can at 555 transmit a message to the neighboring MNO network device, indicating to the neighboring MNO network device that it no longer needs the authorized frequency.

At step 560, regular operation resumes, wherein each MNO network device operates on its own frequencies.

In example embodiments, a device (e.g., one or more devices, which may be networked), comprising a processor and a memory that stores executable instructions that, when executed by the processor, can facilitate performance of operations, including those operations/methods as described above, and also below in FIGS. 6, 7, and 8.

Figure 6:
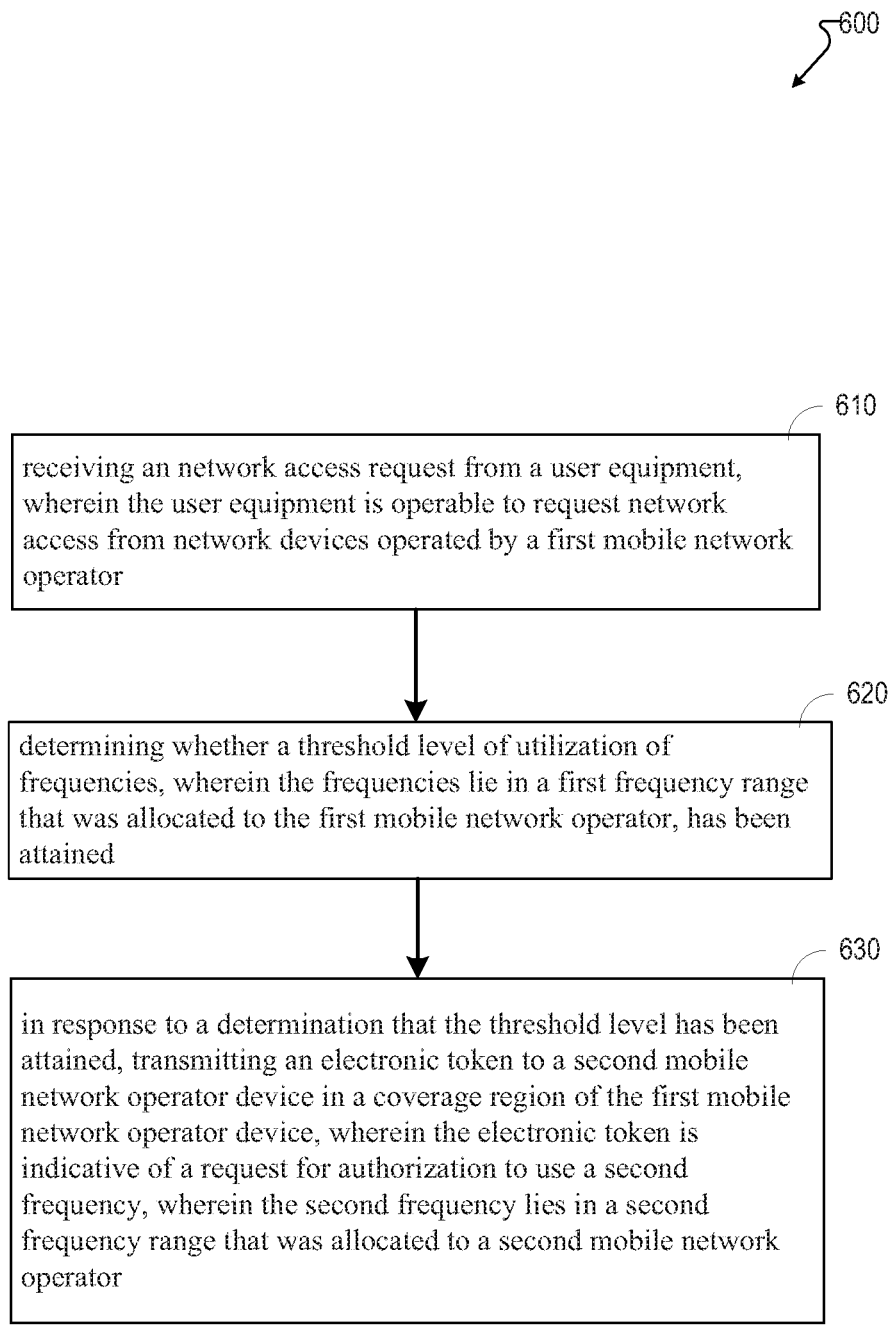
FIG. 6 illustrates example operations that can be performed by a first MNO network device that transmits a token indicative of a request for authorization to use a frequency in a frequency range that is allocated to a second MNO, in accordance with various aspects and example embodiments of the present invention.

FIG. 6 illustrates a flow diagram of operations that can be performed, for example, by a first mobile network operator device (e.g., first MNO network device $305_1$) in accordance with example embodiments of the present invention.

At block 610, the operations can comprise receiving an access request from a user equipment (e.g., UE 102, first MNO UEs 310), wherein the user equipment is operable to request network access from network devices operated by a first mobile network operator (e.g., first MNO $205_1$).

At block 620, the operations can further comprise determining whether a threshold level of utilization of frequencies wherein the frequencies lie in a first frequency range (first frequency range $210_1$) that was allocated to the first mobile network operator (first MNO $205_1$), has been attained (e.g., percentage of frequencies that have already been allocated, percentage remaining, etc.).

At block 630, the operations can further comprise, in response to a determination that the threshold level has been attained, transmitting an electronic token (e.g., electronic token 315) to a second mobile network operator device (e.g., second MNO network device $305_2$) in a coverage region of the first mobile network operator device, wherein the electronic token is indicative of a request for authorization to use a second frequency, wherein the second frequency lies in a second frequency range (e.g., second frequency range $210_2$) that was allocated to a second mobile network operator (e.g., second MNO $205_2$).

The operations can further comprise receiving, from the second mobile network operator device, the authorization to use the second frequency. The operations further comprise granting the bandwidth request from the user equipment. Granting the bandwidth request can comprise assigning the second frequency to the user equipment for communications between the user equipment and the first multiple network operator device. The operations can further comprise determining whether an additional frequency, other than the first frequency and the second frequency, is to be used by the first network operator device (e.g., the frequency utilization level is still high enough that it attains the threshold level). In response to determining that the additional frequency is to be used, the operations can comprise transmitting a second electronic token. The first mobile network operator device can determine if a period has elapsed without receiving a response to the transmitting the electronic token. In response to determining that the period has elapsed, an electronic token can be re-transmitted by the first multiple network operator device.

Figure 7:
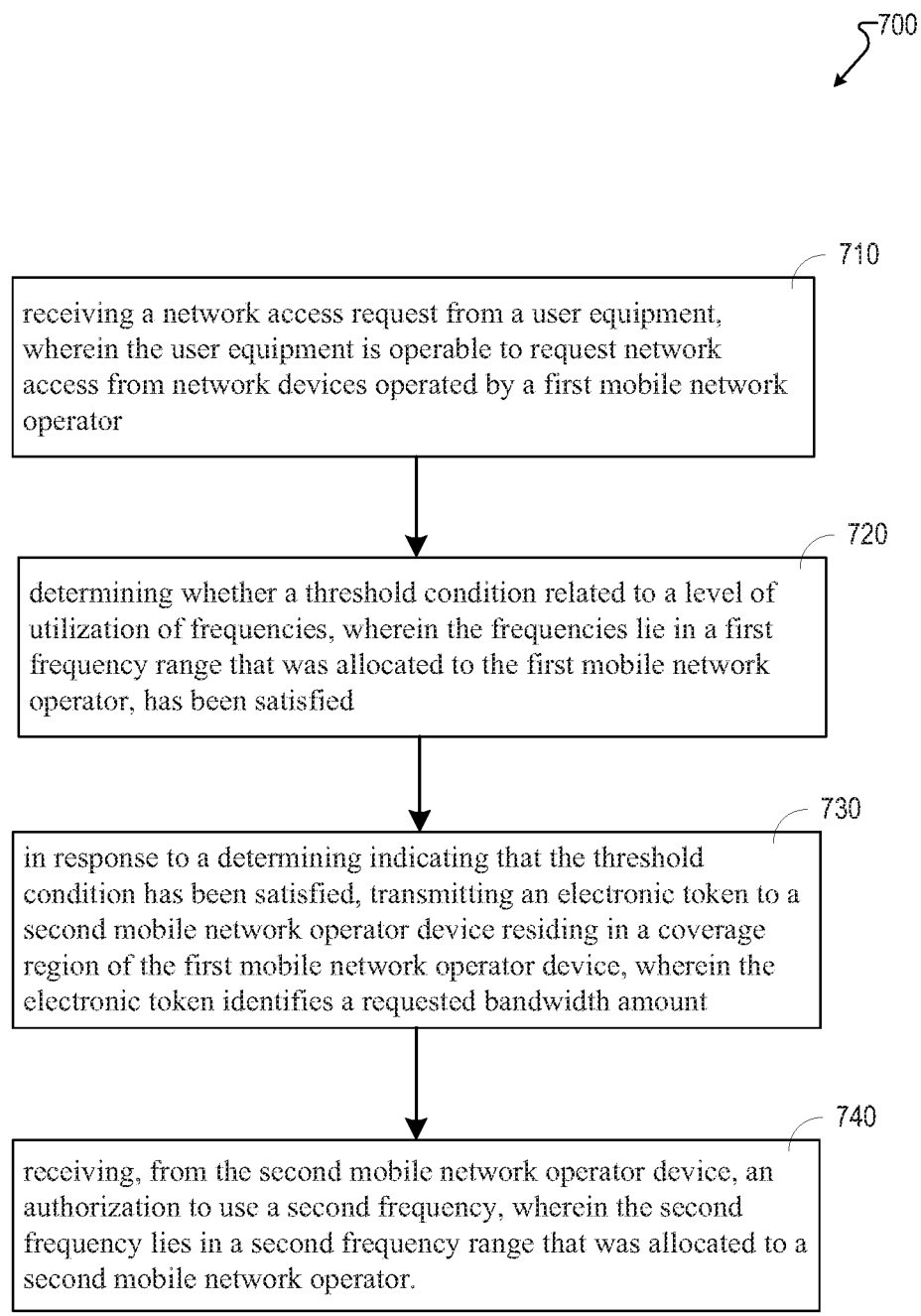
FIG. 7 also illustrates another example of operations that can be performed by a first MNO network device that transmits a token indicative of a request for authorization to use a frequency in a frequency range that is allocated to a second MNO, in accordance with various aspects and example embodiments of the present invention.

FIG. 7 illustrates another flow diagram of operations that can be performed, for example, by a first mobile network operator device (e.g., first MNO network device $305_1$) in accordance with example embodiments of the present invention.

At block 710, the operations can comprise receiving a network access request from a user equipment (e.g., UE 102, first MNO UEs 310), wherein the user equipment is operable to request network access from network devices operated by a first mobile network operator (e.g., first MNO $205_1$).

At block 720, the operations can comprise determining whether a threshold condition related to a level of utilization of frequencies, wherein the frequencies lie in a first frequency range (e.g., first frequency range $210_1$) that was allocated to the first mobile network operator, has been satisfied (e.g., a certain percentage of frequencies has already been assigned, a certain percentage of frequencies remain, etc.).

At block 730, the operations can comprise, in response to a determining indicating that the threshold condition has been satisfied, transmitting an electronic token (e.g., electronic token 315) to a second mobile network operator device (e.g., second MNO network device $305_2$) residing in a coverage region of the first mobile network operator device, wherein the electronic token identifies a requested bandwidth amount (e.g., a bandwidth amount, the number of frequencies needed, a target number of frequencies, etc.).

At block 740, the operations can comprise receiving, from the second mobile network operator device, an authorization to use a second frequency, wherein the second frequency lies in a second frequency range (e.g., second frequency range $210_2$) that was allocated to a second mobile network operator (second MNO $205_2$).

The operations can further comprise granting network access to the user equipment, the allocating comprising assigning the second frequency to the user equipment for communications with the first mobile network operator device.

The operations can further comprise determining whether the authorization is sufficient to satisfy the requested network access. The operations can further comprise, based on a determination that the authorization was insufficient (e.g., the target number of frequencies was three, but the authorization was for one frequency), transmitting a second electronic token.

The operations can further comprise transmitting a message to the second mobile network operator device indicating that the second frequency is no longer being used by the first mobile network operator device.

Figure 8:
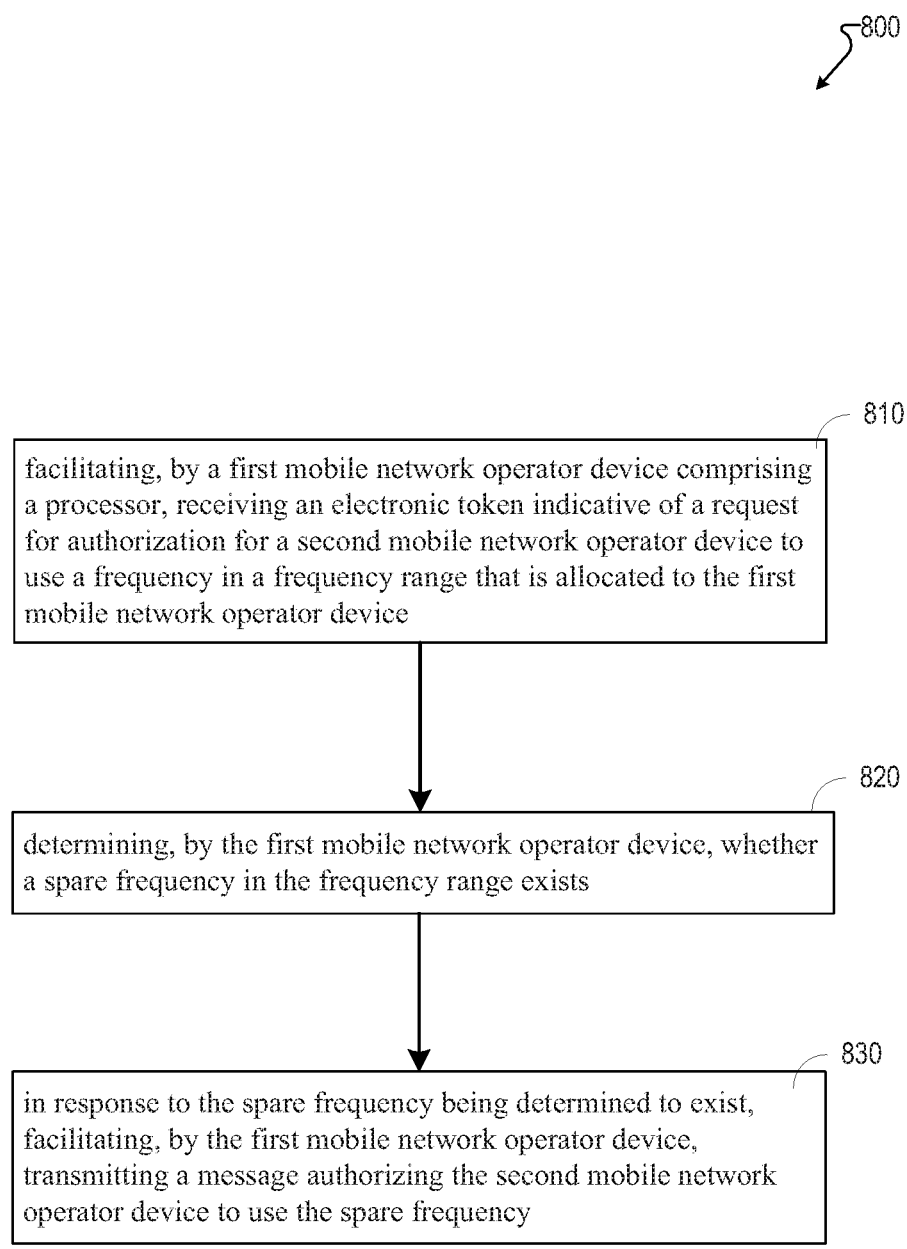
FIG. 8 illustrates a method that can be performed by an MNO network device authorizing a second operator in the same coverage area to use a frequency that was allocated to the MNO owning or operating the MNO network device, in accordance with various aspects and example embodiments of the subject invention.

FIG. 8 illustrates another flow diagram of a method that can be performed, for example, by a mobile network operator device (e.g., second MNO network device $305_2$, wherein the method is from the perspective of the second MNO device $305_2$, so for illustrative purposes, $305_2$ is designated as the first network operator device).

At step 810, the method can comprise facilitating, by a first mobile network operator device comprising a processor, receiving an electronic token (e.g., electronic token 315) indicative of a request for authorization for a second mobile network operator device (e.g., first MNO network device $305_1$) to use a frequency in a frequency range (e.g., second frequency range $210_2$) that is allocated to the first mobile network operator device (e.g., the second frequency range $210_2$ has been allocated to devices in the second MNO $205_2$'s network). The electronic token can also be received from a spectrum access system (SAS) that manages frequency allocations.

At 820, the method can further comprise determining, by the first mobile network operator device, whether a spare frequency in the frequency range exists (e.g., a frequency that is at the time not being used by the first network device).

At step 830, the method can comprise, in response to the spare frequency being determined to exist, facilitating, by the first mobile network operator device, transmitting a message authorizing the second mobile network operator device to use the spare frequency. The message can comprise frequency information representative of the spare frequency (e.g., identifying the frequency(s) that the second mobile network operator device is authorized to use). The message comprises a data element identifying the first mobile network operator device.

The method can comprise, in response to the spare frequency being determined not to exist, forwarding, by the first mobile network operator device, the electronic token to a third mobile network operator operating in a coverage area of the second mobile network operator device.

The method of can further comprise receiving, by the first mobile network operator device, a communication from the second mobile network operator device indicating that the spare frequency is no longer required by the second mobile network operator device (e.g., the second mobile network operator device can determine which MNO device to send this communication to because of the data element identifying the first mobile network operating device contained in the electronic token).

Figure 9:
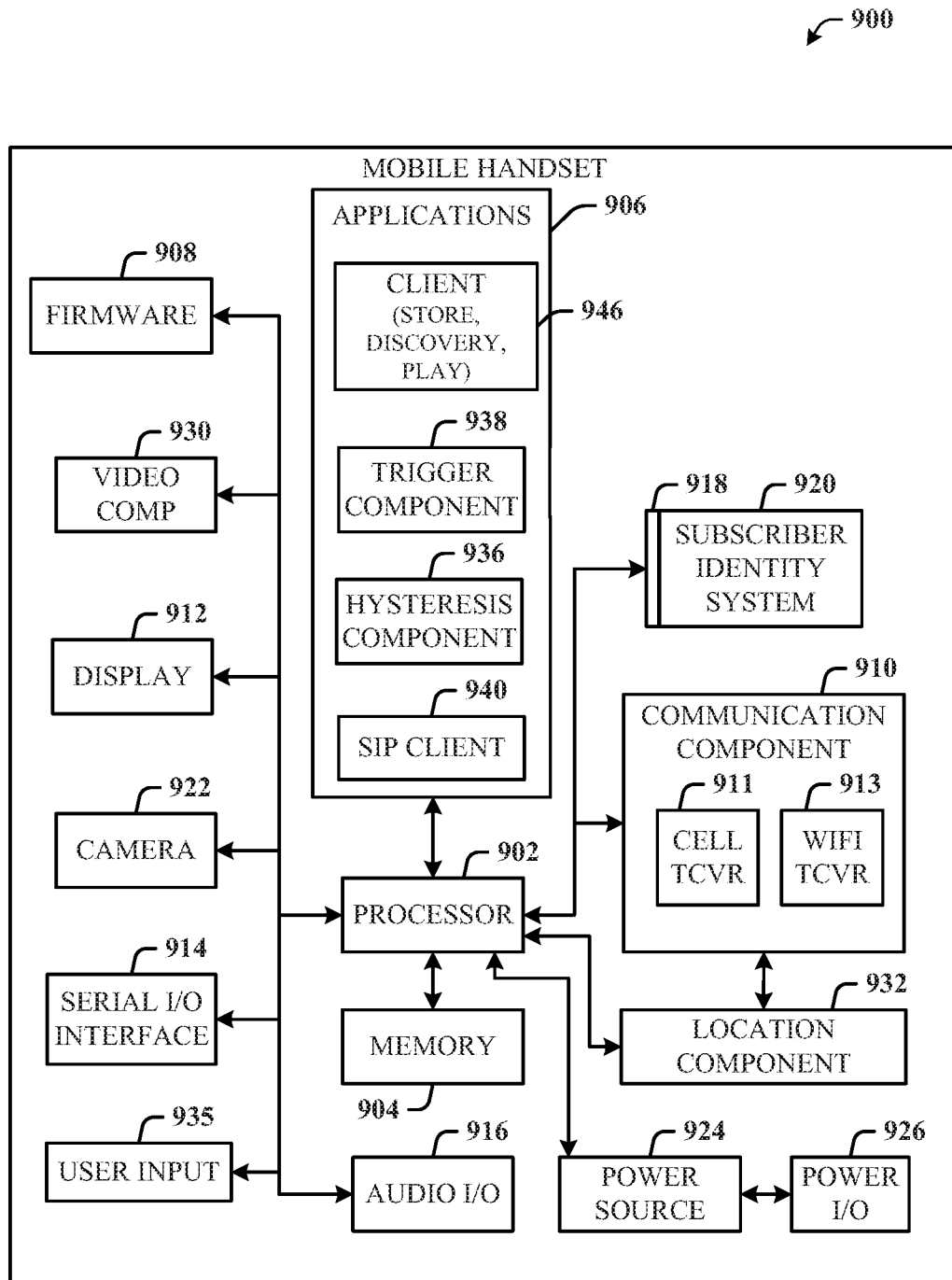
FIG. 9 illustrates an example block diagram of an example user equipment, in accordance with various aspects and example embodiments of the present invention.

Referring now to FIG. 9, illustrated is a schematic block diagram of an example end-user device such as a user equipment (e.g., UE 102) that can be a mobile device capable of connecting to a network in accordance with some embodiments described herein. One or more of the components as illustrated in FIG. 9 can comprise the user equipment, and although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment in which the various embodiments can be implemented. While the description comprises a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and that can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The handset 900 comprises a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 comprises a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also comprises a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, comprises an indoor network radio transceiver 913 (e.g., Wi-Fi transceiver). This function supports the indoor radio link, such as IEEE 802.11, for a dual-mode GSM handset. The handset 900 can accommodate at least satellite radio services through a handset that can combine wireless voice and digital radio chipsets into a single handheld device.

Figure 10:
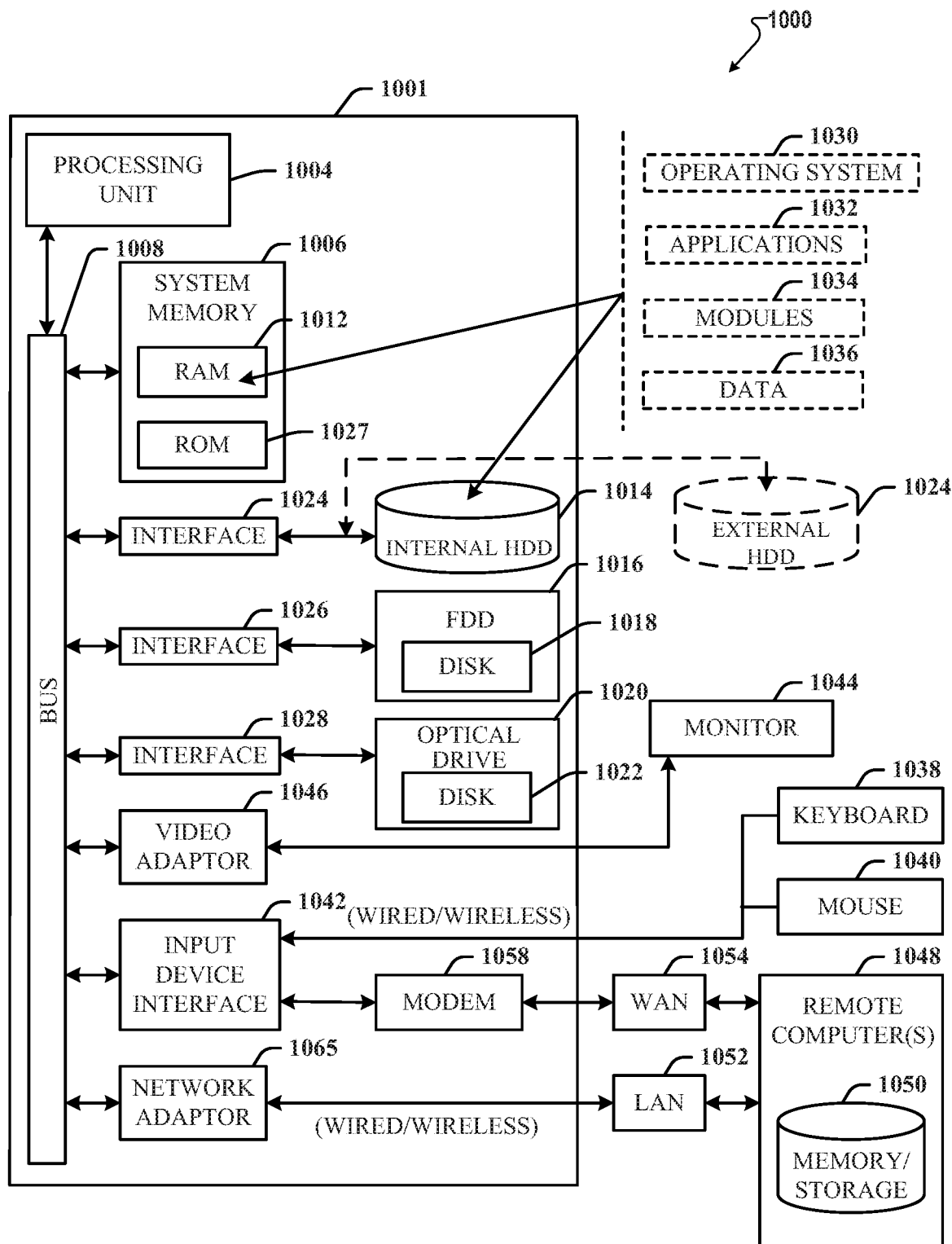
FIG. 10 illustrates an example block diagram of a computer that can be operable to execute processes and methods described here, in accordance with various aspects and example embodiments of the present invention.

Referring now to FIG. 10, there is illustrated a block diagram of a computer 1000 operable to execute the functions and operations performed in the described example embodiments. For example, relay devices can contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects and example embodiments described herein, devices (e.g., MNO network devices, network node devices) can include a computer 1000, the computer 1000 comprising a processing unit 1004, a system memory 1006 and a system bus 1008. The system bus 1008 couples system components comprising the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further comprises an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE 1294 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. It is to be appreciated that the embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 2394 serial port, a game port, a USB port, an IR interface, etc.

A monitor 1044 or other type of display device is also connected to the system bus 1008 through an interface, such as a video adapter 1046. In addition to the monitor 1044, a computer 1000 typically comprises other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically comprises many, if not all of, the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure.

For example, disclosed systems and apparatuses and components or subsets thereof (referred to hereinafter as components) should neither be presumed to be exclusive of other disclosed systems and apparatuses, nor should an apparatus be presumed to be exclusive to its depicted components in an example embodiment or embodiments of this disclosure, unless where clear from context to the contrary. Additionally, steps or blocks as shown in example methods, or operations, can be interchangeable with steps or blocks as show in other example methods/operations. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of components (or embodiments) into a single component achieving aggregate functionality, where suitable, or distribution of functionality of a single system or component into multiple systems or components, where suitable. In addition, incorporation, combination or modification of systems or components depicted herein or modified as stated above with systems, apparatuses, components or subsets thereof not explicitly depicted herein but known in the art or made evident to one with ordinary skill in the art through the context disclosed herein are also considered within the scope of the present disclosure.

Therefore, the disclosed subject matter should not be limited to any single embodiment described herein, but rather should be construed in breadth and scope in accordance with the claims below.

What is claimed is:

1. First network equipment, comprising:
a processor; and
a memory that stores executable instructions that, when executed by the processor, facilitate performance of operations, comprising:
receiving a network access request from a user equipment, wherein the user equipment is operable to request network access from the first network equipment operated by a first mobile network operator;
determining whether a threshold level of utilization of first frequencies, wherein the first frequencies lie in a first frequency range that was allocated to the first mobile network operator, has been attained;
in response to a determination that the threshold level has been attained, transmitting an electronic token to second network equipment in a coverage region of the first mobile network operator device, wherein the electronic token is indicative of a request for authorization to use a target number of second frequencies, wherein the second frequencies lie in a second frequency range that was allocated to a second mobile network operator associated with the second network equipment; and
receiving from third network equipment, authorization to use a third frequency that lies in a third frequency range that was allocated to a third mobile network operator associated with the third network equipment, wherein the third network equipment received the electronic token from the second network equipment.

2. The first network equipment of claim 1, wherein the operations further comprise:
receiving, from the second network, the authorization to use a second frequency of the second frequencies.

3. The first network equipment of claim 1, wherein the operations further comprise:
granting the network access request from the user equipment comprising assigning the third frequency to the user equipment for communications between the user equipment and the first network equipment.

4. The first network equipment of claim 3, wherein the operations further comprise determining whether an additional frequency, other than the first frequencies and the third frequency, is to be used by the first network equipment.

5. The first network equipment of claim 4, wherein the electronic token is a first electronic token, and the operations further comprise:
in response to determining that the additional frequency is to be used, transmitting a second electronic token.

6. The first network equipment of claim 1, wherein the operations further comprise determining whether a period has elapsed without receiving a response to the transmitting of the electronic token from the second network equipment.

7. The first network equipment of claim 6, wherein the operations further comprise:

in response to determining that the period has elapsed, re-transmitting the electronic token to the second network equipment.

8. A method, comprising:
facilitating, by first network equipment comprising a processor, receiving an electronic token indicative of a request for authorization for second network equipment to use a target number of first frequencies in a first frequency range that is allocated to the first network equipment, wherein a second frequency range is allocated to the second network equipment;
determining, by the first network equipment, whether the target number of first frequencies in the first frequency range exists to be allocated to the second network equipment; and
in response to determining that the target number of first frequencies in the first frequency range does not exist to be allocated to the second network equipment, facilitating, by the first network equipment, transmitting the electronic token to third network equipment that has been allocated a third frequency range that is different from the first frequency range.

9. The method of claim 8, wherein the electronic token comprises information representative of the second network equipment.

10. The method of claim 8, wherein the electronic token comprises information representative of the first network equipment.

11. The method of claim 8, further comprising:
in response to determining that a portion of the target number of first frequencies in the first frequency range to be allocated to the second network equipment does exist, facilitating, by the first mobile network operator device, transmitting a message authorizing the second mobile network operator device to use the portion of the target number of first frequencies in the first frequency range.

12. The method of claim 11, further comprising:
receiving, by the first network equipment, a communication from the second network equipment indicating that the portion of the target number of first frequencies in the first frequency range is no longer required by the second network equipment.

13. The method of claim 12, assigning, by the first network equipment, the portion of the target number of first frequencies in the first frequency range to a user equipment.

14. A non-transitory machine-readable medium, comprising executable instructions that, when executed by a processor of first network equipment, facilitate performance of operations, the operations comprising:
receiving a network access request from a user equipment, wherein the user equipment is operable to request network access from the first network equipment operated by a first mobile network operator;
determining whether a threshold level of utilization of first frequencies, wherein the first frequencies lie in a first frequency range that was allocated to the first mobile network operator, has been attained;
in response to a determination that the threshold level has been attained, transmitting an electronic token to second network equipment in a coverage region of the first mobile network operator device, wherein the electronic token is indicative of a request for authorization to use a target number of second frequencies, wherein the second frequencies lie in a second frequency range that was allocated to a second mobile network operator associated with the second network equipment; and
receiving, from third network equipment, authorization to use a third frequency that lies in a third frequency range that was allocated to a third mobile network operator associated with the third network equipment, wherein the third network equipment received the electronic token from the second network equipment.

15. The non-transitory machine-readable medium of claim 14, wherein the operations further comprise:
receiving, from the second network equipment, the authorization to use a second frequency of the second frequencies.

16. The non-transitory machine-readable medium of claim 14, wherein the operations further comprise:
granting the network access request from the user equipment comprising assigning the third frequency to the user equipment for communications between the user equipment and the first network equipment.

17. The non-transitory machine-readable medium of claim 16, wherein the operations further comprise determining whether an additional frequency, other than the first frequencies and the third frequency, is to be used by the first network equipment.

18. The non-transitory machine-readable medium of claim 17, wherein the electronic token is a first electronic token, and the operations further comprise:
in response to determining that the additional frequency is to be used, transmitting a second electronic token.

19. The non-transitory machine-readable medium of claim 14, wherein the operations further comprise determining whether a period has elapsed without receiving a response to the transmitting of the electronic token from the second network equipment.

20. The non-transitory machine-readable medium of claim 19, wherein the operations further comprise:
in response to determining that the period has elapsed, re-transmitting the electronic token to the second network equipment.

* * * * *